(12) United States Patent
Kraus et al.

(10) Patent No.: US 6,659,254 B2
(45) Date of Patent: Dec. 9, 2003

(54) CLUTCH DISC

(75) Inventors: Martin Kraus, Bühlertal (DE);
Hans-Dieter Elison, Bühl-Oberweier (DE); Rudolf Hönemann, Ottersweier (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/078,073

(22) Filed: Feb. 14, 2002

(65) Prior Publication Data

US 2002/0117373 A1 Aug. 29, 2002

(30) Foreign Application Priority Data

Feb. 23, 2001 (DE) .......................... 101 08 875

(51) Int. Cl.[7] .............................................. F16D 13/68
(52) U.S. Cl. ..................................................... 192/200
(58) Field of Search ........................... 192/200, 70.11, 192/70.17, 107 C

(56) References Cited

U.S. PATENT DOCUMENTS

| | | | |
|---|---|---|---|
| 2,259,461 A | * 10/1941 | Eason | 192/70.17 |
| 2,296,515 A | 9/1942 | Goodwin | |
| 2,902,130 A | 9/1959 | Halberg et al. | |
| 2,904,150 A | * 9/1959 | Sand | 192/70.17 |
| 3,695,405 A | 10/1972 | Maucher et al. | |
| 4,398,625 A | 8/1983 | Beccaris | |
| 4,741,424 A | 5/1988 | Kitano et al. | |
| 5,085,307 A | 2/1992 | Scheer | |
| 5,161,660 A | 11/1992 | Huber | |
| 5,413,202 A | 5/1995 | Maucher | |
| 5,662,200 A | * 9/1997 | Memmel et al. | 192/70.17 |
| 5,759,106 A | 6/1998 | Reik et al. | |
| 5,776,288 A | * 7/1998 | Stefanutti et al. | 192/107 R |
| 5,797,474 A | * 8/1998 | Nakane et al. | 192/200 |
| 5,857,551 A | * 1/1999 | Yoneda | 192/107 C |
| 5,984,073 A | * 11/1999 | Lohaus et al. | 192/70.17 |

FOREIGN PATENT DOCUMENTS

| | | |
|---|---|---|
| DE | 14 25 18 | 10/1968 |
| DE | 19 20 242 | 11/1970 |
| DE | 21 11 892 | 9/1972 |
| DE | 26 41 379 | 6/1977 |
| DE | 27 20 664 C 2 | 11/1977 |
| DE | 30 23 634 | 1/1981 |
| DE | 43 00 665 A1 | 9/1983 |
| DE | 36 18 876 C 2 | 12/1986 |
| DE | 36 19 894 C2 | 1/1987 |
| DE | 39 39 120 C2 | 5/1990 |
| DE | 196 26 688 A1 | 1/1997 |
| DE | 197 12 203 A1 | 10/1997 |
| GB | 2 269 641 A | * 2/1994 |

* cited by examiner

Primary Examiner—Rodney H. Bonck
(74) Attorney, Agent, or Firm—Darby & Darby

(57) ABSTRACT

A clutch disc, particularly for use between a pressure plate and a counterpressure plate in a friction clutch which is installed in the power train of a motor vehicle, has two friction linings flanking resilient carriers mounted on a washer which has a hub connectable with a torque receiving part, such as the input shaft of a change-speed transmission. The carriers are connected with reinforcing sections of the friction linings by rivets in such a way that the friction linings and the washer are movable radially relative to each other. This reduces the likelihood of excessive wear upon the friction linings in response to repeated engagement and disengagement of the clutch.

24 Claims, 3 Drawing Sheets

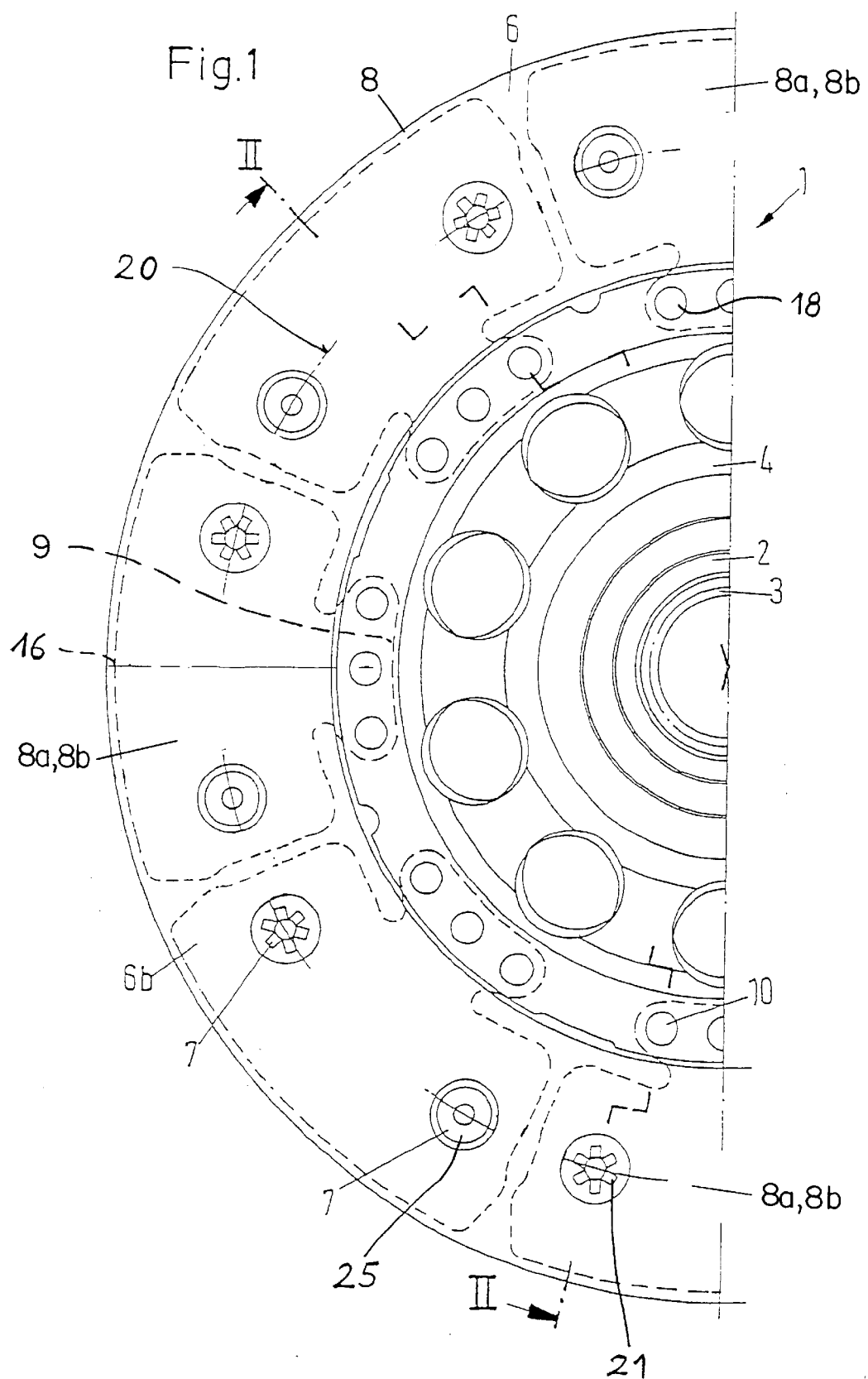

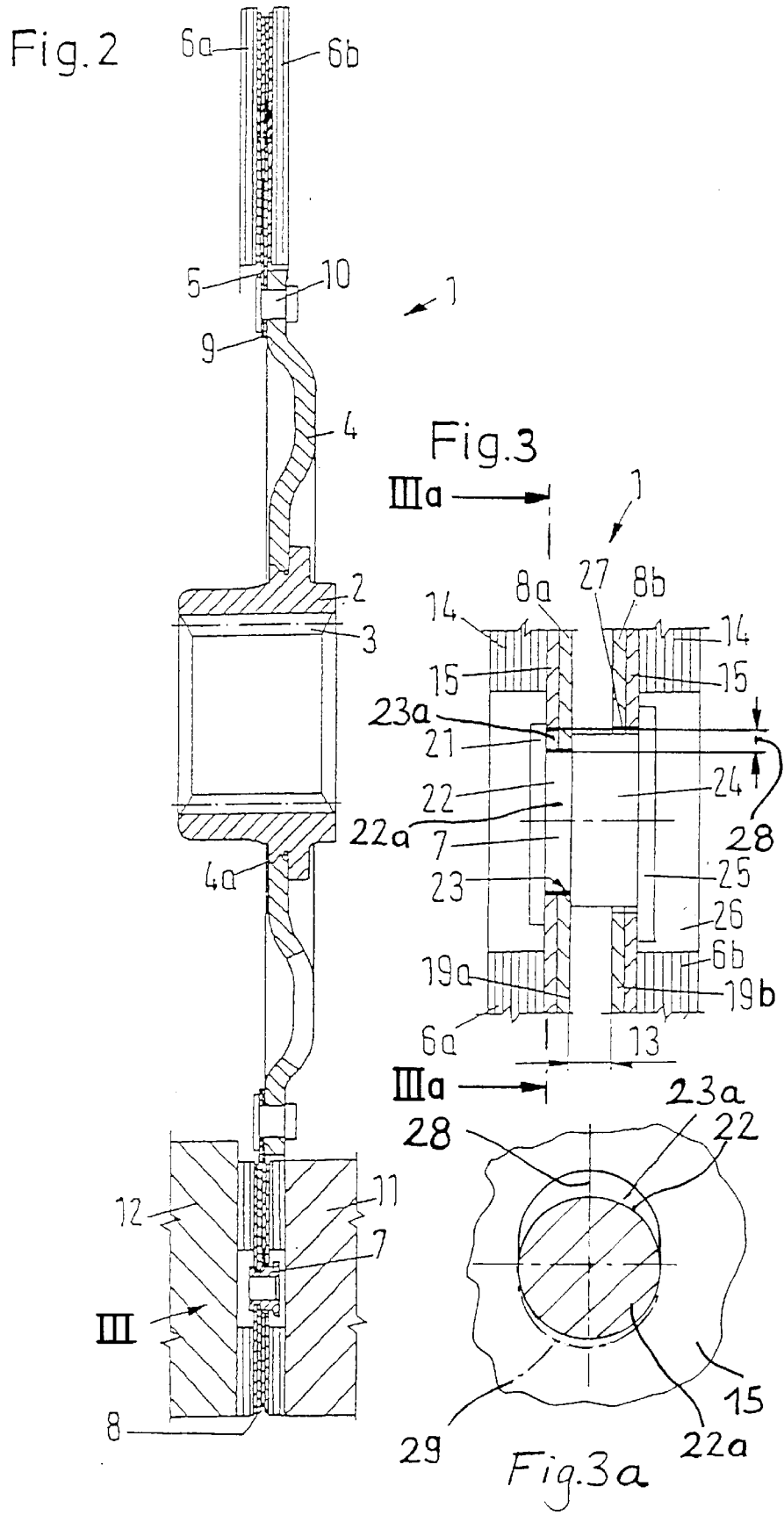

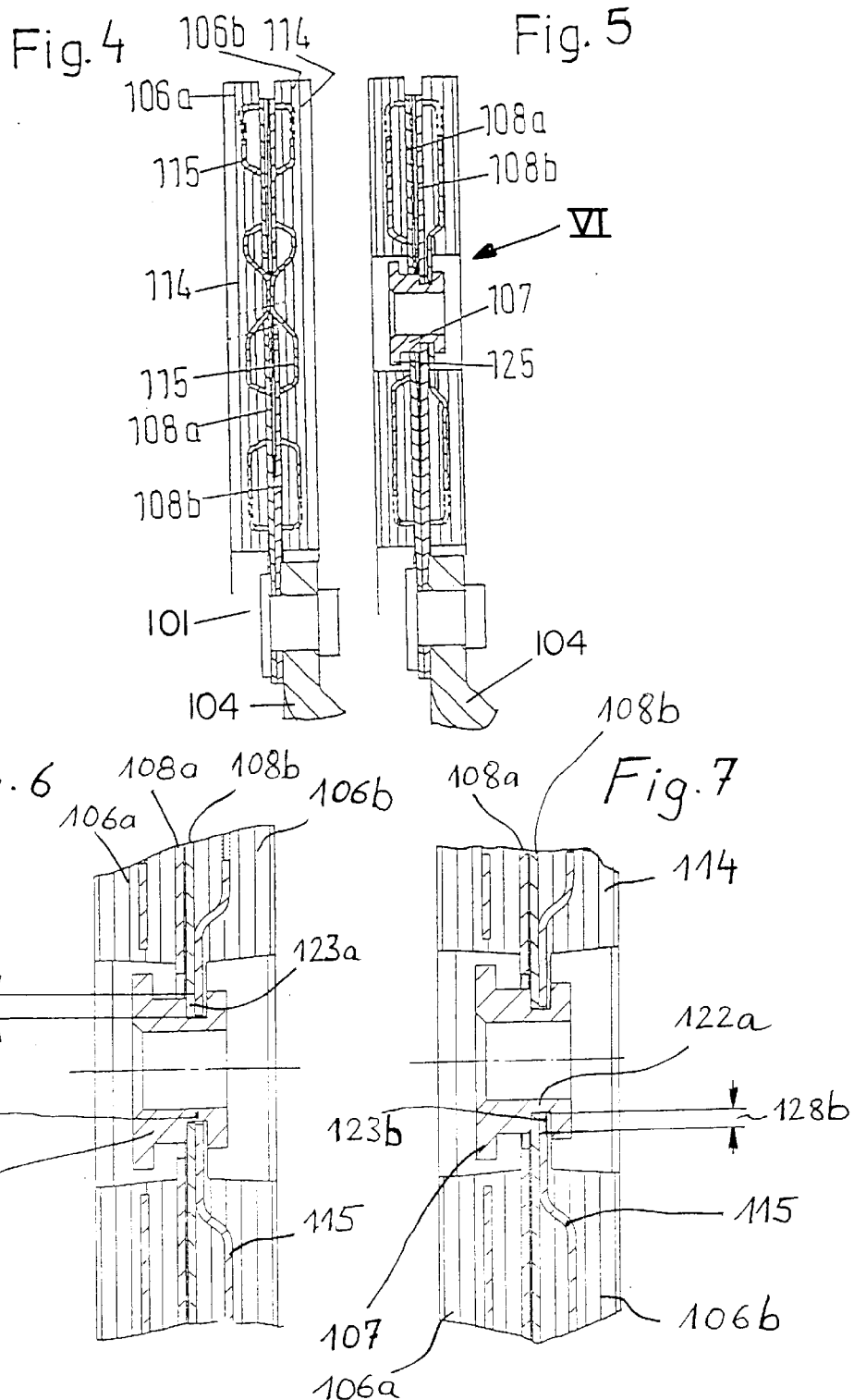

CLUTCH DISC

CROSS REFERENCE TO RELATED CASES

This application claims the priority of the commonly owned copending German patent application Serial No. 101 08 875.2 filed Feb. 23, 2001. The disclosure of such commonly owned copending patent application, as well as of that of each US and foreign patent and patent application identified in the specification of the present application, is incorporated herein by reference.

BACKGROUND OF THE INVENTION

The present invention relates to improvements in clutch discs (also called clutch plates) which are utilized in friction clutches to transmit torque between rotary driving and driven parts. Examples of systems which employ friction clutches are power trains of motor vehicles wherein a friction clutch is engageable to transmit torque between the output shaft (such as a crankshaft or a camshaft) of an engine or another prime mover and the input shaft of a change-speed transmission. The clutch disc of the friction clutch in such power trains is arranged to transmit torque between a counter-pressure plate receiving torque from an engine-driven output shaft and the input shaft of the transmission when the clutch is at least partly engaged. Such engagement normally involves causing a suitable spring (such as a diaphragm spring) to push an axially movable pressure plate against the clutch disc and to thus maintain the clutch disc in a more or less pronounced frictional engagement with the counterpressure plate.

A standard clutch disc comprises a hub which is non-rotatably connectable with a rotary driven shaft, at least one washer-like carrier which is affixed to or forms part of and surrounds the hub, and two annular friction linings or facings borne by the radially outer-most portion of the carrier. When the friction clutch is engaged, one of the friction linings is in frictional contact with the counterpressure plate and the other lining is engaged by the pressure plate. It is also customary to employ a resilient lining carrier between the two friction linings. Friction clutches of the just outlined character are disclosed, for example, in published German patent application No. 30 23 634, in German patent No. 27 20 664, in published German patent application No. 26 41 379, in U.S. Pat. No. 2,296,515 (granted Sep. 22, 1942 to Goodwin for "CLUTCH PLATE") and in U.S. Pat. No. 5,085,307 (granted Feb. 4, 1992 to Scheer for CLUTCH DISC").

Engagement (activation) of a friction clutch involves the establishment of an abrupt or gradual frictional contact between one friction lining of the clutch disc and the pressure plate (which rotates at the speed of the output element of the prime mover) as well as between the other friction lining and the engine-driven counterpressure plate (this counterpressure plate can constitute a simple or a composite flywheel). The friction linings slide relative to the adjacent parts (pressure plate and counterpressure plate) while the friction clutch is partly engaged, and this can result in the generation of pronounced friction heat. As disclosed in U.S. Pat. No. 2,902,130 (granted Sep. 1, 1959 to Halberg et al. for "CLUTCH PLATE"), friction heat can cause warping or dishing of the pressure plate and counterpressure plate (flywheel) which results in a deformation causing the pressure plate to assume a conical shape. A similar (but normally less pronounced) deformation is also observable on the counterpressure plate. The just discussed deformation(s) entails or entail the development, between the friction surfaces of the pressure plate and the counterpressure plate, of a gap which widens radially inwardly or radially outwardly and is presently sought to be eliminated by resilient mounting of the friction linings on their carrier. Thus, the friction linings are mounted on the carrier in such a way that at least certain portions thereof can yield in the axial direction of the friction clutch. The afore-mentioned resilient friction lining carrier constitutes a presently preferred means for compensation of undue or excessive wear upon the component parts of the friction clutch.

Friction which develops in response to actuation (especially during engagement) of the friction clutch not only entails a pronounced wear upon the friction linings but the resulting heat also causes pronounced thermal stressing of the material of which the friction linings (and the parts supporting the friction linings) consist. Thus, the thermally induced expansion coefficients of the materials of various constituents of a friction clutch or of a clutch disc are quite different. Furthermore, all components of a friction clutch are not heated and/or cooled to the same extent when the friction clutch is actuated. All this results in pronounced deformation of various parts to a different extent due to different stresses which develop as a result of unequal heating and/or cooling.

Pronounced and non-uniform deformation of friction linings and/or of neighboring parts in a friction clutch can result, among others, in a dishing and/or axial undulation of friction linings which can be sufficiently pronounced to create problems in connection with proper operation of (such as the establishment of necessary clearances in) the friction clutch. Thus, the friction linings are not likely to become fully or adequately disengaged from the adjacent plates when the friction clutch is to be fully disengaged; this causes the friction linings to rub against the friction surfaces of the adjacent pressure plate and counterpressure plate and to cause the prime mover to transmit to the transmission so-called drag torque which is highly undesirable because it causes the generation of unnecessary wear, uneven wear, undesirable heat and other problems. The primary cause for the development of drag torque is believed to be undesirable and unpredictable heating and/or cooling of component parts of the friction clutch and the resulting bimetallic effect. Such effect can develop due to different radial expansion and different radial shifting of various parts of the friction linings and/or of their resilient lining carrier or carriers.

All in all, the overall adverse effect upon a friction clutch as a result of uneven or non-uniform heating and cooling of its components includes not only a less satisfactory or less predictable clutch engaging and disengaging action but also non-uniform wear upon the friction linings and hence a pronounced shortening of useful life of the clutch disc and/or of the entire friction clutch.

OBJECTS OF THE INVENTION

An object of the present invention is to provide a clutch disc which is less affected by changes in temperature than heretofore known friction clutches.

Another object of the invention is to provide a friction clutch wherein the constituents are connected to each other in a novel and improved way.

A further object of the invention is to provide a friction clutch which is designed in such a way that it can at least partially compensate for undesirable deformation of its constituents as a result of repeated heating and cooling due to repeated engagement, disengagement and partial engagement of the clutch.

An additional object of the invention is to provide a relatively simple and inexpensive clutch disc which can be put to use in existing types of friction clutches.

Still another object of the instant invention is to provide a friction clutch which embodies a clutch disc or clutch plate of the above outlined character.

A further object of our invention is to provide a novel and improved combination of friction linings, lining holder or carrier and cushioning spring or springs for use in a friction clutch.

Another object of the invention is to provide a novel and improved method of assembling a clutch disc for use in friction clutches and the like.

A further object of the invention is to provide a clutch disc which can stand pronounced mechanical and/or thermal stresses more reliably than heretofore known clutch discs.

An additional object of the invention is to provide novel and improved friction linings, friction lining cushions and friction lining carriers for use in the clutch discs for friction clutches.

SUMMARY OF THE INVENTION

The invention resides in the provision of a rotary clutch disc for use in friction clutches. The improved clutch disc comprises a friction facing which includes at least one annular friction lining, at least one carrier for the at least one friction lining, and torque transmitting means which serves to connect the at least one friction lining to the at least one carrier in such a way that the at least one friction lining and the at least one carrier have at least some freedom of radial movement relative to each other, i.e., movements other than radial movements are not necessarily excluded but the at least one friction lining has some freedom of radial movement relative to the at least one carrier and/or vice versa.

The arrangement can be such that at least a part of the torque transmitting means is movable within limits with the at least one friction lining relative to the at least one carrier or with the at least one carrier relative to the at least one friction lining. Alternatively, the improved clutch disc can be assembled in such a way that at least a part of the torque transmitting means is movable within limits relative to the at least one friction lining as well as relative to the at least one carrier.

In accordance with a presently preferred embodiment, the torque transmitting means includes solid and/or hollow rivets.

The at least one friction lining and/or the at least one carrier can be provided with openings and the torque transmitting means can include portions (such as the aforementioned rivets) which are received in the openings with freedom of radial movement relative to the respective openings. The portions of the torque transmitting means can be received in the openings at least substantially without play as seen in the circumferential direction of the at least one annular friction lining.

Alternatively, the at least one friction lining can be provided with first openings and the at least one carrier can be provided with second openings which register with the first openings. The torque transmitting means of such clutch disc can include first portions each of which is received with radial play in one of the first and second openings, and second portions each of which is received without radial play in the other of the first and second openings. In other words, the first and second openings of each pair of registering openings respectively receive first and second portions of the torque transmitting means.

The at least one carrier can include a resilient part and the torque transmitting means can connect the at least one friction lining to such resilient part. If the friction facing includes a plurality of friction linings, the torque transmitting means can be arranged to connect the at least one carrier with each of the friction linings. Each such friction lining can include a portion extending radially outwardly beyond the at least one carrier. The resilient part of the at least one carrier can be provided with openings, and the torque transmitting means can include components (such as the aforementioned rivets) which extend through such openings.

The at least one friction lining can include an annular reinforcing member and a friction generating part (such as a pad) which is borne by the reinforcing member. The reinforcing member can be at least partially embedded in the pad, and such reinforcing member can consist, at least in part, of sheet metal.

The at least one carrier can include an annular disc having a radially outer portion and two springs provided on the radially outer portion. The friction facing of such clutch disc can include two annular washer-like friction linings which flank the springs. At least one of these friction linings can include an annular array of arcuate segments, and the two friction linings can be disposed back-to-back.

The at least one carrier can include an annular array of first portions, and the at least one friction lining can include an annular array of second portions each of which overlies a part of or an entire first portion. The torque transmitting means of such clutch disc can include a plurality of discrete mechanical fasteners each of which connects one of the first portions to the overlapping second portion with limited freedom of movement at least substantially radially of the clutch disc. The fasteners can include rivets which form an annular array of alternating first and second rivets; the heads of the first rivets are disposed at one side and their deformed end portions are disposed at the other side of the at least one friction lining. On the other hand, the heads of the second rivets are disposed at the other side and their deformed end portions are located at the one side of the at least one friction lining, Each of the first portions is connected with the at least partially overlying second portion by a plurality of rivets and the portions of at least one of the annular arrays can consist, at least in part, of a resilient material.

The friction facing is provided with exposed at least substantially annular first and second friction surfaces which are respectively engageable by third and fourth friction surfaces provided on a pressure plate and a counterpressure plate of an engageable and disengageable friction clutch in the engaged condition of such clutch.

The at least one carrier can include a hub which is at least substantially coaxial with the at least one annular friction lining. The latter can include portions which are movable at least substantially radially of the clutch disc relative to as well as independently of each other.

The at least one friction lining of the friction facing can include at least one non-metallic portion having an exposed friction surface and at least one at least partially metallic reinforcing portion which is at least partially embedded in the at least one non-metallic portion.

The improved clutch disc or clutch plate can be utilized with advantage in friction clutches which are installed in the power trains of motor vehicles to transmit torque (when necessary) between the output shaft of the prime mover and the input shaft of the change-speed transmission.

The novel features which are considered as characteristic of the invention are set forth in particular in the appended claims. The improved clutch disc itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 1 is a fragmentary elevational view of a clutch disc which embodies one form of the present invention;

FIG. 2 is a sectional view substantially as seen in the direction of arrows from the line II—II in FIG. 1;

FIG. 3 is an enlarged view of the detail which is indicated in FIG. 2 by the arrow III;

FIG. 3a is a sectional view as seen in the direction of arrows from the line IIIa—IIIa in FIG. 3;

FIG. 4 is a fragmentary axial sectional view of a modified clutch disc;

FIG. 5 is another fragmentary axial sectional view of the clutch disc of FIG. 4;

FIG. 6 is an enlarged view of a detail which is indicated in FIG. 5 by arrow VI; and FIG. 7 illustrates a portion of a further clutch disc in a view corresponding to that of FIG. 6.

DESCRIPTION OF PREFERRED EMBODIMENTS

FIGS. 1 and 2 illustrate a clutch plate or clutch disc 1 (hereinafter called clutch disc) including a washer-like input member or carrier 4 having a centrally located cylindrical hub 2 provided with axially parallel internal teeth 3. Such teeth enable the hub 2 to slide onto a splined shaft (not shown), e.g., onto the input shaft of a change-speed transmission so that the latter can receive torque from a prime mover which rotates the composite friction facing 6a, 6b of the clutch disc or vice versa when the friction clutch including the clutch disc 1 is at least partially engaged. The manner in which a clutch disc forming part of a friction clutch can transmit torque between the output shaft (such as a camshaft or a crankshaft) of an internal combustion engine and an input shaft of a change-speed transmission is described and shown, for example, in commonly owned U.S. Pat. No. 5,759,106 granted Jun. 2, 1998 to Reik et al. for "ASSEMBLY FOR COMPENSATION OF FLUCTUATIONS OF TORQUE".

The carrier 4 is non-rotatably affixed to the hub 2, e.g., by caulking (as shown at 4a), by welding or in another suitable manner. The means for transmitting torque between the carrier 4 and the friction linings 6a, 6b of the friction facing includes a washer-like resilient support 5 which is flanked by and is secured to the two friction linings 6a, 6b in a novel and improved way, namely by an annular array of rivets (mechanical fasteners) 7 one of which is shown in detail in FIGS. 3 and 3a. The illustrated resilient support 5 is assembled of segments 8 each of which includes two sections or parts 8a, 8b disposed back-to-back. The support 5 can be said to form part of a composite carrier which further includes the member 4, or to form part of the means for transmitting torque between the member 4 and the friction linings 6a, 6b.

The radially innermost portions 9 of the back-to-back sections 8a, 8b overlie the radially outermost portion of the carrier 4 and are rigidly secured thereto by a second ring-shaped array of rivets 10. Clutch discs of the type having friction linings affixed to composite resilient supports assembled of segments having pairs of sections, with the sections of each pair disposed back to back are disclosed, for example, in German patents Nos. 21 11 892 and 14 25 186 and in published German patent applications Nos. 19 20 242 and 43 00 665.

The present invention can be embodied with equal advantage in clutch discs of the type wherein the composite segments are replaced with one-piece segments, i.e., wherein each such segment need not be assembled of pairs of back-to-back sections corresponding to sections 8a, 8b shown in FIG. 3 of the present application. Reference may be had, for example, to German patent No. 36 18 878 and to published German patent applications Nos. 39 39 120 and 36 19 894. The above-enumerated seven German patents and published German patent applications are but a few examples of clutch discs with and without composite resilient segments for friction linings which can be constructed and assembled in accordance with the present invention.

The sections 8a, 8b of each composite segment 8 are two separately or simultaneously produced parts which are or can be thereupon placed back-to-back and secured to the carrier 4 by sets of rivets 10 (see FIG. 1). However, it is equally possible to affix all of the sections 8a, 8b to a suitable annular support (not shown) in a first step and to thereupon affix the annular support to the overlapping or overlapped radially outermost portion of the carrier 4 in a next-following (second) step. The just mentioned annular support can replace or can be affixed to the radially innermost portions 9 of the sections 8a, 8b.

Still further, the clutch disc 1 can be replaced with a clutch disc wherein the means for transmitting torque between the hub and the friction linings can include at least one torsional vibration damper which permits the hub and the friction linings to turn relative to each other clockwise and counterclockwise through a selected angle. Reference may be had to certain of the aforementioned U.S. and foreign patents and patent applications as well as to commonly owned U.S. Pat. No. 5,161,660 granted Nov. 10, 1992 to Huber for "CLUTCH PLATE WITH PLURAL DAMPERS".

The lower portion of FIG. 1 shows that the properly installed clutch disc 1 is disposed between a counterpressure plate 12 (which can be driven by the output shaft of a combustion engine or another prime mover) and an axially movable pressure plate 11 (which is also driven by the prime mover) of a friction clutch installed in a power train between the engine and the input shaft of the transmission in a motor vehicle. If the clutch is to be engaged, a diaphragm spring or the like (not shown) is or can be employed to bias the friction surface of the pressure plate 11 against the adjacent friction surface of the friction lining 6b and to thus bias the friction surface of the friction lining 6a against the adjacent friction surface of the counterpressure plate 12. Reference may be had again to the aforementioned U.S. Pat. No. 5,759,106 to Reik et al.

When the friction clutch employing the clutch disc 1 of FIGS. 1 to 3a is disengaged, the two friction linings 6a, 6b of the composite friction facing are disposed at a maximum axial distance 13 (see FIG. 3) from each other. FIG. 2 shows the friction linings 6a, 6b at a lesser axial distance from each other, i.e., the friction clutch embodying the clutch disc 1 of FIG. 2 is assumed to be at least partially engaged. This also holds true for the clutch discs 101 embodying the friction linings 106a, 106b shown in FIGS. 4 to 7.

As can be seen in FIG. 3, each of the friction linings 6a, 6b includes a ring-shaped part or pad 14 which is connected with a combined reinforcing and supporting part 15 preferably made of sheet metal. The connection between the parts 14 and 15 of each of the two friction linings 6a, 6b can be established by resorting to a suitable adhesive, by baking or in another suitable manner. The reinforcing parts 15 of the two friction linings 6a, 6b confront each other, and the aforementioned sections 8a, 8b of the segments 8 are disposed between the reinforcing parts 15. FIG. 1 shows that each segment 8 includes two halves which are mirror images of each other with reference to a plane 16 that is normal to the plane of FIG. 1 and includes the axis of the clutch disc 1. The radially innermost portions 9 of the sections 8a, 8b of each segment 8 are secured to each other and to the radially outermost portion of the carrier 4 by the aforementioned rivets 10 which extend through openings 18 provided in the portions 9 and through registering openings of the carrier 4.

The sections 8a, 8b of the segments 8 respectively have hills 19a, 19b and valleys, and the hills of each pair of overlapping sections 8a, 8b are adjacent each other and are connected to each other by discrete rivets 7. The axes of all such rivets are disposed at the same radial distance from the axis of the hub 2, i.e., they form a circle 20 (see FIG. 1) having its center located on the axis of the hub 2.

The rivet 7 which is shown in FIG. 3 is installed in such a way that its head 25 overlies the reinforcing member 15 of the friction lining 6b and its upset (deformed) end portion 21 overlies the reinforcing member 15 of the friction lining 6a. The head 25 of the next rivet 7 (as seen circumferentially of the friction linings 6a and 6b) overlies the reinforcing member 15 of the friction lining 6a and its upset end portion 21 overlies the reinforcing member 15 of the friction lining 6b. This can be readily seen in FIG. 1 wherein the heads 25 of successive rivets 7 at the exposed side of the friction lining 6b alternate with the upset portions 21 of such rivets.

FIG. 3 further shows that the upset portion 21 of the rivet 7 connects the section 8a to the reinforcing member 15 of this rivet. The shank 24 and the upset portion 21 of the rivet 7 which is shown in FIG. 3 define an annular groove which receives the adjacent portions of the section 8a and the reinforcing member 15 of the friction lining 6a. To this end, the reinforcing member 15 of the friction lining 6a has an oval opening 23a (see also FIG. 3a) which receives the smaller-diameter portion 22a of the shank 24 with a certain play 28 (as seen in the radial direction of the clutch disc 1) but without any or with negligible play as seen in the circumferential direction of the clutch disc. The shank 24 extends through openings 27 in the section 8b and reinforcing portion 15 of the friction lining 6b shown in FIG. 3. The diameter of the head 25 exceeds the diameters of the openings 27 for the shank 24; this head serves as an abutment for the reinforcing portion 15 of the friction lining 6b, and this reinforcing portion serves as an abutment for the hill 19b of the section 8b. The upset end portion 21 serves as an abutment for the reinforcing portion 15 of the friction lining 6a and for the adjacent hill 19a of the section 8a.

The axial length of the shank 24 of each rivet 7 is or can be selected in such a way that, even when the clutch disc 1 is not compressed between the friction surfaces of the pressure plate 11 and the counterpressure plate 12, the sections 8a, 8b still store some energy. However, it is also possible to dimension the rivets 7 and to select the configurations of the hills 19a, 19b in such a way that the sections 8a, 8b are stressed only when the friction clutch employing the clutch disc 1 is at least partly engaged or that the stressing of the sections 8a, 8b under such circumstances is negligible.

In order to assemble it with the friction linings 6a and 6b in a manner as shown in FIG. 3, the (undeformed) rivet 7 is inserted in a direction to the left so that its shank 24 extends through the opening 26 of the segment 14 of the friction lining 6b and thereupon through the opening 27 of the right-hand reinforcing member 15, the opening 27 of the right-hand section 8b and the opening 23 of the left-hand section 8a. The end portion 21 is thereupon deformed (upset) in a manner as shown in FIG. 1 so that the parts 25, 21 of the thus finished rivet 7 prevent the distance 13 between the two hills or crests 19a, 19b (of the sections 8a and 8b) from exceeding that which is shown in the lower part of FIG. 3. The shoulder between the smaller-diameter portion 22a and the major portion of the shank 24 cooperates with the upset portion 21 to maintain the section 8a in abutment with the reinforcing member 15 of the friction lining 6a. The reinforcing member 15 of the friction lining 6b bears upon the adjacent reinforcing section 8b because it stores at least some-energy, i.e., it tends to move axially of the rivet 7 and away from the section 8a. The ring-shaped part 14 has an opening for each of the rivets 7, and each such opening is large enough to accommodate the upset portion 21 or the head 25 of a rivet. Each such rivet maintains the reinforcing members 15 of the friction linings 6a, 6b at an axial distance from each other which matches the clearance 13 plus the combined thickness of two reinforcing members 15 plus the combined thickness of the sections 8a, 8b.

The rivets 7 can constitute full rivets; however, it is often preferred to employ rivets that are hollow at least in the regions of those ends (at 21) which are remote from the heads 25. This ensures that the portions 21 can be upset (e.g., in a manner as shown in FIG. 1) in response to the exertion of relatively small forces. FIGS. 5, 6 and 7 show rivets 107 which are hollow from end to end.

FIGS. 3 and 3a show that the openings 23a of the reinforcing members 15, i.e., the openings which receive the smaller-diameter portions 22a of the shanks 24 of the respective rivets 7, are oval with their longer axes extending radially of the clutch disc 1, i.e., at right angles to the axis of the hub 2. Regardless of the exact configuration of a shank portion 22a and of the respective opening 23a, the rivet 7 of FIGS. 3 and 3a, and hence the friction lining 6a, has at least some freedom (shown at 28 in FIG. 3a) of radial movement relative to the friction lining 6a; the next rivet 7 (as seen in the circumferential direction of the carrier 4) and the friction lining 6a have at least some freedom of radial movement relative to the friction lining 6b; and so forth. On the other hand, the friction linings 6a and 6b have limited, negligible or no freedom of movement relative to each other in the circumferential direction of the improved clutch disc 1. Such arrangement constitutes a desirable and advantageous feature of the improved clutch disc in that it prevents undesirable stray movements relative to each other of those parts which are coupled together by the rivets 7. Moreover, the wear upon the parts in the regions of the shanks 24 of the rivets 7 is less pronounced than if the friction linings 6a, 6b were free to carry out multidirectional stray movements relative to each other, i.e., movements other than those permitted owing to specific configurations of the rivets 7 and of those portions of various parts (6a, 6b, 8) which are adjacent to these rivets.

The clearances or plays 28 permit at least radial or substantially radial movements of the friction linings 6a, 6b and of the resilient sections 8a, 8b relative to each other. Such freedom of radial movement reduces the likelihood of the development of pronounced stresses and hence excessive temporary and/or permanent deformations of the parts 6a and 6b, 8a and 8b and/or other components of the friction clutch, especially those which are connected to each other by the rivets 7. Depending upon the expandibility of the parts which are riveted to each other, it might be desirable to assemble the clutch disc in such a way that, at a normal temperature (e.g., 20° C.), the shank portion 22a of each rivet 7 be mounted in the respective opening 23 with a radially inner clearance 28 as wel as with a radially outer clearance or play 29 (see FIG. 3a); the latter clearance is indicated by dot-dash lines because it is optional.

In accordance with a further embodiment, the portion 22a of the shank 24 of each rivet 7 can be received in the opening of the respective reinforcing member 15 without any play or with negligible play. However, the portion 22a of the shank 24 is then received with radial play in an opening of the section 8a or 8b; the opening of the section 8a or 8b can resemble the opening 23a which is shown in FIG. 3a.

The clearances 28 and/or 29 between the portions 22a of rivet shanks 24 and the reinforcing members 15 provide room for radial movements and/or for radial expansion and/or for radial contraction of the friction linings 6a and 6b and/or of the parts to which the friction linings are connected, i.e., of the reinforcing members 15 relative to the sections 8a, 8b shown in FIGS. 1 to 3a. Such radial movements take place due to different thermal coefficients of the parts which are connected to each other by the rivets 7.

In accordance with a further modification, the spring characteristics of the sections 8a, 8b can be selected in such a way that the force which is required to flatten these sections exceeds the force which must be applied to the pressure plate 11, normally by a diaphragm spring or the like (see, for example, the diaphragm spring 12 in FIG. 1 of the aforementioned U.S. Pat. No. 5,759,106 to Reik et al.). This ensures that the sections 8a, 8b still have at least some freedom of yieldability, even when the friction clutch embodying the clutch disc 1 is fully engaged.

The friction linings 106a, 106b of the composite friction facing in the clutch disc 101 a portion of which is shown in FIGS. 4 to 6 include circular reinforcing or supporting members 115 each of which is at least partially but preferably at least substantially embedded in the ring-shaped part or pad 114 of the respective friction lining. As concerns the construction of such friction linings, reference may be had also to the published German patent application No. 197 12 203. Regarding the exact nature of the reinforcing members 115 and of friction linings employing such reinforcing members, reference may be had to the published German patent application No. 196 26 688 A1.

FIGS. 6 and 7 illustrate rivets 107 the configurations and the functions of which resemble those of the rivets 7 in the clutch disc 1 of FIGS. 1 to 3a. As shown in FIGS. 1 to 3a for the rivets 7, the rivets 107 and the adjacent parts are also shown in positions they assume when the respective friction clutches are fully engaged. The structure which is shown in FIG. 7 differs from the structure of FIG. 6 in that, in FIG. 6, the radial clearance 128a is established due to the configuration and the size of the opening 123a which is provided in the region of a section 108b. On the other hand, FIG. 7 shows a radial clearance or play 128b which is established owing to the size and shape of an opening 123b which is provided in the reinforcing member 115 and/or in the friction generating material of the ring-shaped part 114.

A further difference between the rivet 107 which is shown in FIG. 6 or 7 and the rivet 7 of FIG. 3 is that, when the stressing of the sections 108a, 108b is relaxed, the head 125 of the rivet 107 directly engages the section 108a. The shank portions 122a of the rivets 107 extend, without play, through one of the sections 108a, 108b and with play through the other of these sections.

An important advantage of the improved clutch disc is that there is room for radial movements of the friction linings and/or of the parts which support the friction linings; this provides room for compensation of differences between the expansion coefficients of the parts which are connected to each other by the rivets 7 or 107. Thus, the connections which are established by the rivets 7 or 107 permit for a "breathing" of each friction lining 6a, 6b or 106a, 106b relative to those parts of the clutch disc which support such friction linings to receive torque therefrom or to transmit torque thereto.

Rivets (7, 107) constitute presently preferred parts of the means for transmitting torque between the friction linings (6a, 6b or 106a, 106b) and their carrier or carriers (such as 4, 8a, 8b or 104, 108a, 108b). As already explained hereinbefore, the rivets ensure that the friction linings and/or the parts to which the friction linings are connected have at least some freedom of radial movement as well as of radial expansion and contraction relative to each other. It is (often or invariably) immaterial whether such freedom of radial movement is achieved by causing or permitting the rivets to move relative to the friction linings and/or relative to the carrier means for the friction linings, and/or by causing or permitting the friction linings to move relative to their carrier means and/or by causing the carrier means to move relative to the rivets and/or relative to the friction linings.

Still further, the arrangement can be such that the rivets or analogous fastener means have freedom of movement relative to the friction linings as well as relative to the carriers for the friction linings. The rivets can form part of the friction linings and/or of the carriers for friction linings. Furthermore, the torque tansmitting means which connects the friction lining or linings to the at least one carrier for friction lining(s) can include parts which resemble or act as rivets but can also perform additional function or functions such as preventing movements of friction lining(s) in direction(s) other than the desired or required direction(s). For example, the rivets or some of the rivets can form part of the friction linings and/or of the resilient part(s) of the carrier or carriers for the friction linings and/or of other part(s) of the carrier(s). If the friction linings comprise several parts (such as the parts 14, 15 of the friction linings 6a and 6b), the rivets can form part of the reinforcing members 15 or they can be rigidly affixed thereto. Each of the reinforcing members 15 can include a washer-like annular portion and axially parallel portions which are convertible into rivets or which can accept rivets or parts which, together with the axially parallel portions, constitute or act as rivets. The axially parallel portions of the friction linings can include or constitute tubes and are or can be made of a metallic material.

The sections (such as 8a and 8b or 108a, 108b) of the carrier means for the friction linings (6a, 6b or 106a, 106b) can be of one piece with the annular carrier (such as 4 or 104) of the improved clutch disc. The sections extend radially outwardly beyond the annular carrier and are or can be at least partially overlapped by (or overlap) the friction linings whereby the rivets or their equivalents extend through the overlapping parts of the carrier sections and friction linings. If the rivets or their equivalents are of one piece with the friction linings or with the sections of the carrier for the friction linings, the carrier sections or the friction linings have openings and/or recesses and/or windows for the rivets or their equivalents.

It goes without saying that the discrete portions (8a, 8b and 108a, 108) of each composite friction lining (6a, 6b and 106a, 106b) are or can be movable radially of the fully assembled clutch disc (1 or 101) independently of each other. For example, the topmost sections 8a, 8b of the two friction linings 6a, 6b shown in FIG. 1 can move up and down relative to the two lowermost sections 8a, 8b while the two leftmost sections 8a, 8b can move to the left and to the right, as viewed in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of clutch discs for use in friction clutches for motor vehicles and the like and, therefore, such adaptations should and are intended to be comprehended within the meaning and range of equivalence of the appended claims.

What is claimed is:

1. A rotary clutch disc for use in friction clutches, comprising:
   a friction facing including at least one annular friction lining;
   at least one carrier for said at least one friction lining; and
   torque transmitting means connecting said at least one friction lining to said at least one carrier with freedom of at least radial movement relative to each other, wherein the torque transmitting means is arranged in the area of the at least one friction lining.

2. The clutch disc of claim 1, wherein at least a part of said torque transmitting means is movable within limits with at least one of said at least one friction lining and said at least one carrier relative to the other of said at least one friction lining and said at least one carrier.

3. The clutch disc of claim 1, wherein at least a part of said torque transmitting means is movable within limits relative to said at least one friction lining and relative to said at least one carrier.

4. The clutch disc of claim 1, wherein said torque transmitting means includes rivets.

5. The clutch disc of claim 1, wherein at least one of said at least one friction lining and said at least one carrier has openings, said torque transmitting means including portions received in said openings with freedom of radial movement relative to the respective openings.

6. The clutch disc of claim 1, wherein at least one of said at least one annular friction lining and said carrier has openings, said torque transmitting means including portions received in said openings at least substantially without play as seen in a circumferential direction of said at least one annular friction lining.

7. The clutch disc of claim 1, wherein said at least one friction lining has first openings and said at least one carrier has second openings registering with said first openings, said torque transmitting means including first portions each received with radial play in one of said first and second openings and second portions each received without radial play in the other of said first and second openings registering with said one of said first and second openings.

8. The clutch disc of claim 1, wherein said at least one carrier includes a resilient part and said torque transmitting means connects said at least one friction lining to said resilient part.

9. The clutch disc of claim 8, wherein said friction facing includes a plurality of friction linings and said torque transmitting means is arranged to connect said at least one carrier with each of said friction linings.

10. The clutch disc of claim 9, wherein each of said friction linings includes a portion extending radially outwardly beyond said at least one carrier.

11. The clutch disc of claim 8, wherein said resilient part has openings and said torque transmitting means includes components extending through said openings.

12. The clutch disc of claim 1, wherein said at least one friction lining includes an annular reinforcing member and a friction generating pad borne by said reinforcing member.

13. The clutch disc of claim 12, wherein said reinforcing member is at least partially embedded in said pad.

14. The clutch disc of claim 12, wherein said reinforcing member consists at least in part of sheet metal.

15. The clutch disc of claim 1, wherein said at least one carrier includes an annular disc having a radially outer portion and two springs provided on said radially outer portion, said friction facing including two annular washer-like friction linings flanking said springs.

16. The clutch disc of claim 15, wherein at least one of said friction linings includes an annular array of arcuate segments.

17. The clutch disc of claim 15, wherein said two friction linings are disposed back-to-back.

18. The clutch disc of claim 1, wherein said at least one carrier has an annular array of first portions and said at least one friction lining has an annular array of second portions each at least partially overlying one of said first portions, said torque transmitting means including a plurality of discrete mechanical fasteners each connecting one of said first portions to the overlapping second portion with limited freedom of movement at least substantially radially of the clutch disc.

19. The clutch disc of claim 18, wherein said fasteners include rivets forming an annular array of alternating first and second rivets, said first rivets having heads at one side and deformed end portions at the other side of said at least one friction lining, said second rivets having heads at the other side and deformed end portions at the one side of said at least one friction lining.

20. The clutch disc of claim 18, wherein each of said first portions is connected with the at least partially overlying second portion by a plurality of rivets and wherein the portions of at least one of said annular arrays consist, at least in part, of a resilient material.

21. The clutch disc of claim 1, wherein said friction facing has exposed at least substantially annular first and second friction surfaces respectively engageable by third and fourth friction surfaces respectively provided on a pressure plate and a counter-pressure plate of an engageable and disengageable friction clutch in the engaged condition of the clutch.

22. The clutch disc of claim 1, wherein said at least one friction lining includes portions which are movable at least substantially radially of the clutch disc relative to and independently of each other.

23. The clutch disc of claim 1, wherein said torque transmitting means includes hollow rivets.

24. The clutch disc of claim 1, wherein said at least one annular friction lining includes at least one non-metallic portion having an exposed friction surface and at least one at least partially metallic reinforcing second portion at least partially embedded in said at least one non-metallic portion.

* * * * *